United States Patent [19]

Whitling et al.

[11] Patent Number: 5,392,322
[45] Date of Patent: Feb. 21, 1995

[54] SHROUD REPAIR CLAMP

[75] Inventors: Robert W. Whitling, Morgan Hill; Barry H. Koepke, San Jose; James E. Charnley, Nevada City, all of Calif.

[73] Assignee: General Electric Company, San Jose, Calif.

[21] Appl. No.: 155,731

[22] Filed: Nov. 22, 1993

[51] Int. Cl.6 ............................................. G21C 19/00
[52] U.S. Cl. .................................. 376/260; 376/302; 29/402.15
[58] Field of Search ............... 376/260, 302, 303, 304; 29/402.01, 402.07, 402.08, 402.14, 402.15, 402.16, 402.17, 723, 906

[56] References Cited

U.S. PATENT DOCUMENTS

| | | | |
|---|---|---|---|
| 4,409,179 | 10/1983 | Burger | 376/302 |
| 4,547,941 | 10/1985 | Meier | 29/402.15 |
| 4,960,650 | 10/1990 | Vigneron et al. | 29/402.16 |
| 5,053,187 | 10/1991 | Haller | 376/258 |

*Primary Examiner*—Daniel D. Wasil
*Attorney, Agent, or Firm*—J. E. McGinness

[57] ABSTRACT

A method and an apparatus for repairing a shroud in which the top guide support ring has been subjected to stress corrosion cracking. The method involves the placement of a plurality of clamps around the outer circumference of the shroud at a plurality of azimuthal positions between jet pump assemblies. The clamps structurally replace the welds that join the top guide support ring to the upper and lower shroud walls. The shroud repair clamps support the top guide, the fuel bundle assemblies and the shroud head. The shroud repair clamps are bolted to the shroud above and below the top guide support ring in a manner which will prevent relative movement across the top guide support ring welds during all normal and upset conditions.

7 Claims, 7 Drawing Sheets

SHROUD REPAIR CLAMP

FIELD OF THE INVENTION

This invention relates to maintenance and repair of nuclear reactors. In particular, the invention relates to the repair of the fuel core shroud of a boiling water reactor.

BACKGROUND OF THE INVENTION

Figure 1:
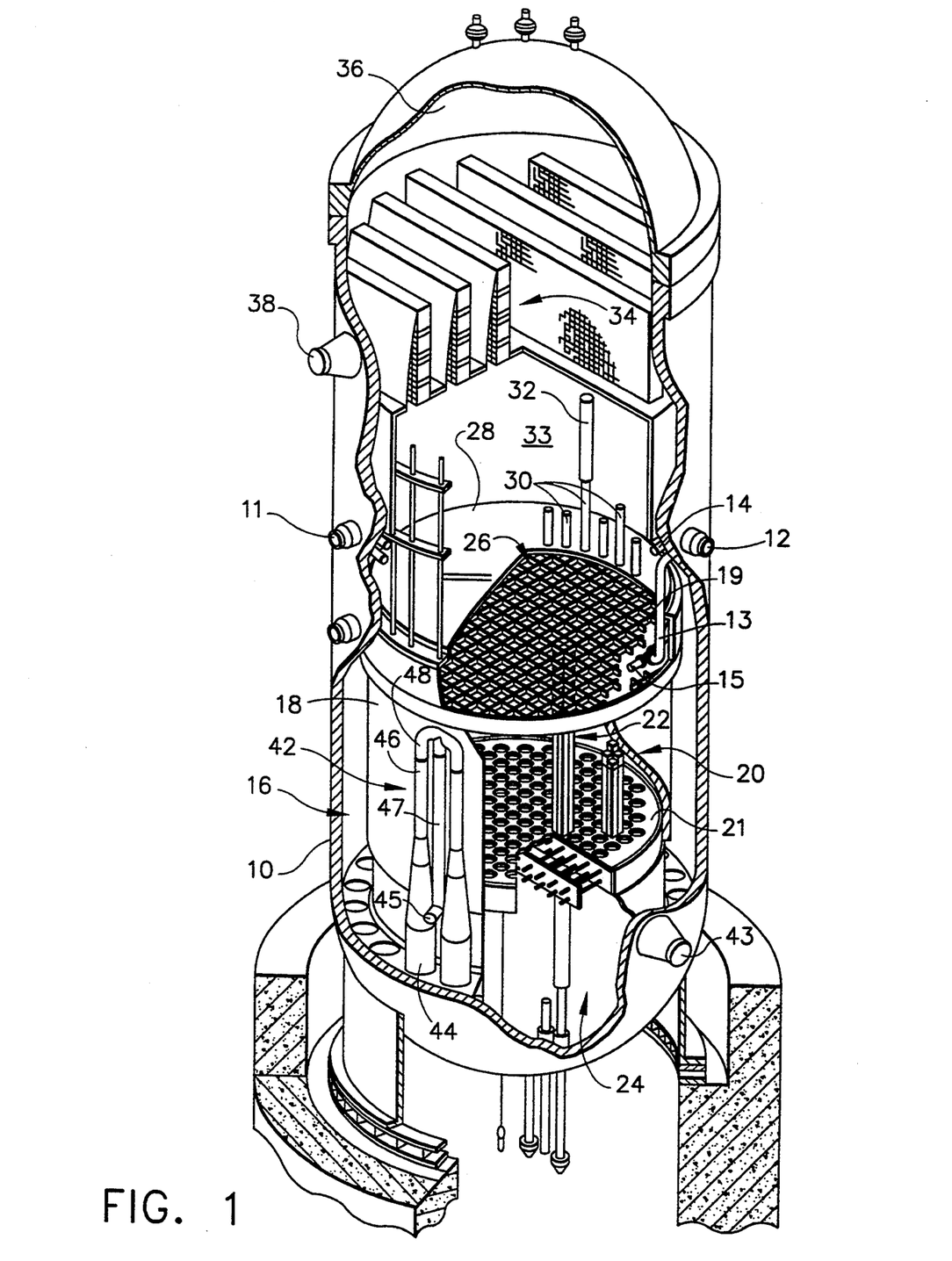
FIG. 1 is a schematic showing a partially cutaway perspective view of a conventional BWR.

A conventional boiling water reactor is shown in FIG. 1. Feedwater is admitted into a reactor pressure vessel (RPV) 10 via a feedwater inlet 12 and a feedwater sparger 14, which is a ring-shaped pipe having suitable apertures for circumferentially distributing the feedwater inside the RPV. A core spray inlet 11 supplies water to a core spray sparger 15 via core spray line 13. The feedwater from feedwater sparger 14 flows downwardly through the downcomer annulus 16, which is an annular region between RPV 10 and core shroud 18. Core shroud 18 is a stainless steel cylinder which surrounds the core 20, which is made up of a plurality of fuel bundle assemblies 22 (only two 2×2 arrays of which are shown in FIG. 1). Each array of fuel bundle assemblies is supported at the top by a top guide 19 and at the bottom by a core plate 21. The core top guide provides lateral support for the top of the fuel assemblies and maintains the correct fuel channel spacing to permit control rod insertion.

The water flows through downcomer annulus 16 to the core lower plenum 24. The water subsequently enters the fuel assemblies 22, wherein a boiling boundary layer is established. A mixture of water and steam enters core upper plenum 26 under shroud head 28. Core upper plenum 26 provides standoff between the steam-water mixture exiting core 20 and entering vertical standpipes 30, which are disposed atop shroud head 28 and in fluid communication with core upper plenum 26.

The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is withdrawn from the RPV via steam outlet 38.

The BWR also includes a coolant recirculation system which provides the forced convection flow through the core necessary to attain the required power density. A portion of the water is sucked from the lower end of the downcomer annulus 16 via recirculation water outlet 43 and forced by a centrifugal recirculation pump (not shown) into jet pump assemblies 42 (only one of which is shown) via recirculation water inlets 45. The BWR has two recirculation pumps, each of which provides the driving flow for a plurality of jet pump assemblies. The pressurized driving water is supplied to each jet pump nozzle 44 via an inlet riser 47, an elbow 48 and an inlet mixer 46 in flow sequence. A typical BWR has 16 to 24 inlet mixers. The jet pump assemblies are circumferentially distributed around the core shroud 18.

The core shroud 18 (see FIG. 2) comprises a shroud head flange 18a for supporting the shroud head 28; a circular cylindrical upper shroud wall 18b having a top end welded to shroud head flange 18a; an annular top guide support ring 18c welded to the bottom end of upper shroud wall 18b; a circular cylindrical lower shroud wall 18d having a top end welded to top guide support ring 18c; and an annular core plate support ring 18e welded to the bottom end of lower shroud wall 18d. The diameter of upper shroud wall 18b is greater than the diameter of lower shroud wall 18d. The entire structure is supported by RPV shroud support 51, which is welded to shroud 18, and by annular shroud support plate 52, which is welded at its inner diameter to RPV shroud support 51 and at its outer diameter to RPV 10.

Stress corrosion cracking (SCC) is a known phenomenon occurring in reactor components, such as structural members, piping, fasteners, and welds, exposed to high-temperature water. The reactor components are subject to a variety of stresses associated with, e.g., differences in thermal expansion, the operating pressure needed for the containment of the reactor cooling water, and other sources such as residual stress from welding, cold working and other asymmetric metal treatments. In addition, water chemistry, welding, heat treatment, and radiation can increase the susceptibility of metal in a component to SCC.

Figure 2:
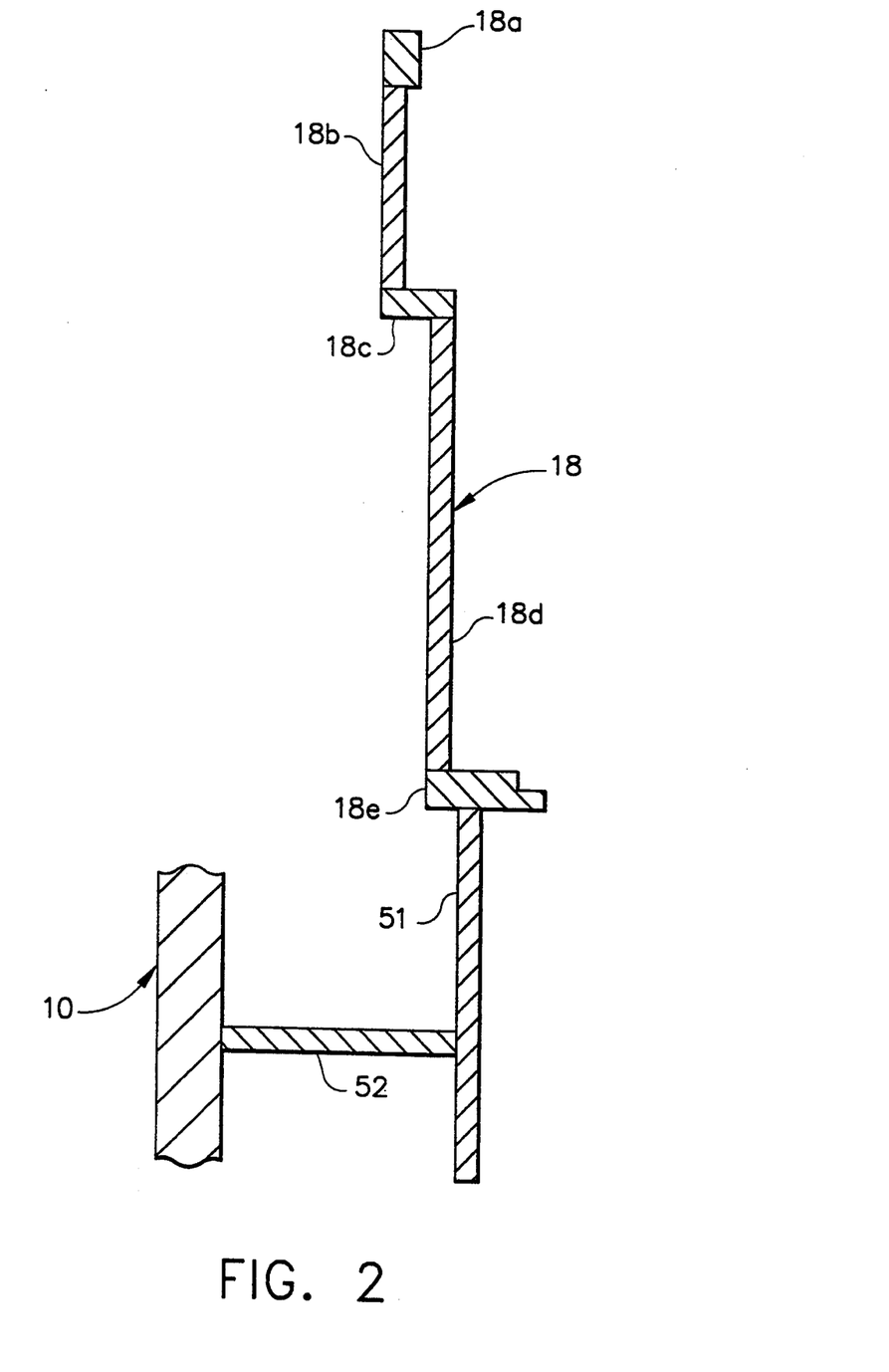
FIG. 2 is a sectional view of a portion of the core shroud of the BWR shown in FIG. 1.

Stress corrosion cracking has been found in the top guide support ring of a BWR. The cracks in top guide support ring 18c extend radially inwardly from the outer circumferential surface thereof and radially outwardly from the inner circumferential surface thereof in the vicinity of the welds which join top guide support ring 18c to shroud walls 18b and 18d.

Stress corrosion cracking in top guide support ring 18c diminishes the structural integrity of shroud 18, which vertically and horizontally supports core top guide 19 and shroud head 28. There is a need for a method and an apparatus for repairing a shroud which has cracks in the top guide support ring.

SUMMARY OF THE INVENTION

The present invention is a method and an apparatus for repairing a shroud in which the top guide support ring has experienced SCC. The method involves the placement of a plurality of clamps around the outer circumference of the shroud at a plurality of azimuthal positions between jet pump assemblies. The clamps are intended to structurally replace the welds that join the top guide support ring to the upper and lower shroud walls.

The shroud repair clamps in accordance with the invention are designed to support the top guide, the fuel bundle assemblies and the shroud head. The clamps are further designed to withstand the thermal and radiological conditions which the shroud is subjected to. The shroud repair clamps are bolted to the shroud above and below the top guide support ring in a manner which will prevent relative movement across the top guide support ring welds during all normal and upset conditions. Further, the shroud repair clamps of the present invention are designed and installed such that removal of jet pump inlet mixers and RPV beltline inspection can be performed without removal of the repair clamps.

DETAILED DESCRIPTION OF THE PREFERRED EMBODIMENTS

Figure 3A:
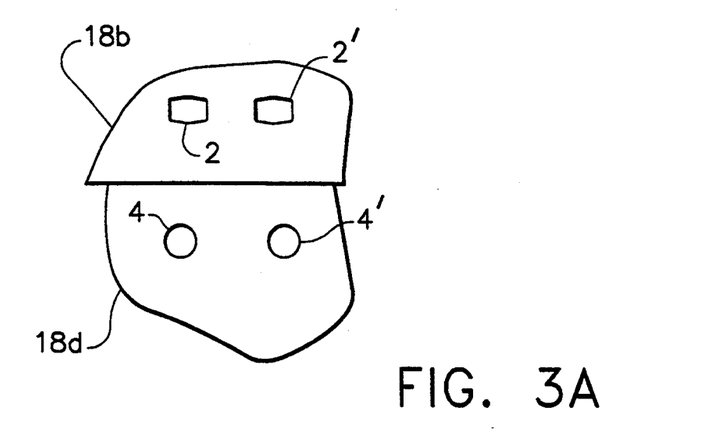
FIG. 3A is an elevational view of a portion of the core shroud showing the hole pattern by which the shroud repair clamp of the invention is installed.

The present invention is a method and an apparatus for repairing a core shroud in which the top guide support ring has been subjected to SCC. The purpose of the shroud repair clamps is to structurally replace welds W1 and W2 which are potentially undermined by cracks C in the top guide support ring (see FIG. 3B). Each shroud repair clamp is bolted to the shroud above and below the top guide support ring in a manner which will prevent relative movement across the top guide support ring welds during all normal and upset conditions. The bolts are installed in holes machined into the shroud walls, as shown in FIG. 3A.

Figure 3B:
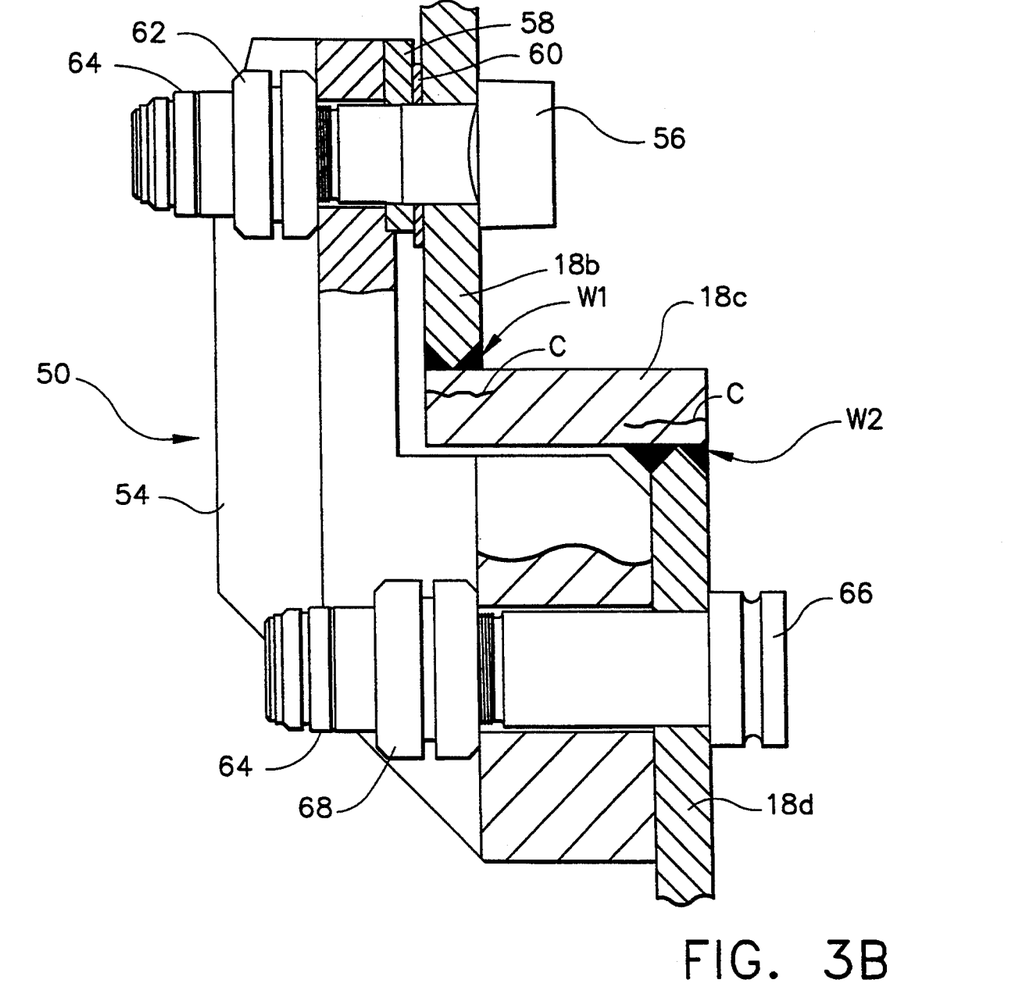
FIG. 3B is a sectional view of an installed shroud repair clamp assembly in accordance with a preferred embodiment of the invention.

An installed shroud repair clamp in accordance with the preferred embodiment is shown in FIG. 3B. The clamp comprises a rigid bracket 54 which is attached to the upper shroud wall 18b by means of a pair of upper bolts 56 and to the upper shroud wall 18d by means of a pair of lower bolts 66 (only one of each pair of bolts is visible in FIG. 3B). Each upper bolt 56 is tensioned by a corresponding nut 62, which nut is locked in the tensioned position by a corresponding nut keeper 64 tack welded to the shank of upper bolt 56. Similarly, each lower bolt 66 is tensioned by a corresponding nut 68, which nut is locked in the tensioned position by a corresponding nut keeper 64 tack welded to the shaft of lower bolt 66.

Figure 4A:
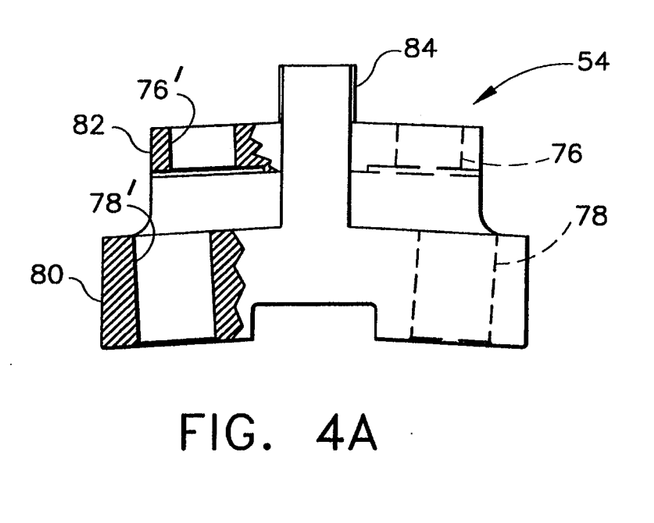
FIGS. 4A, 4B and 4C are bottom, side and plan views, respectively, of a bracket incorporated in the shroud repair clamp assembly shown in FIG. 3B.
Figure 4B:
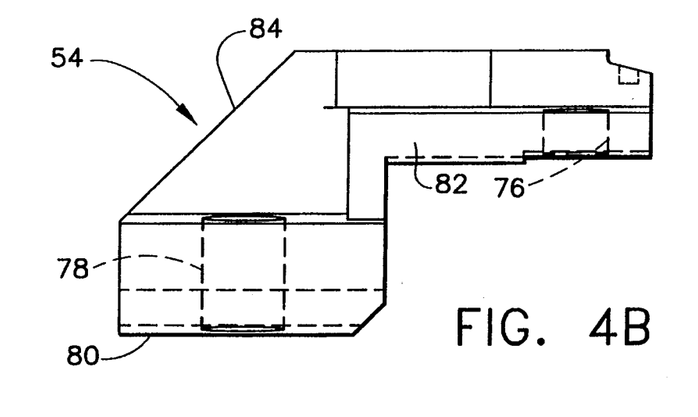
Figure 4C:
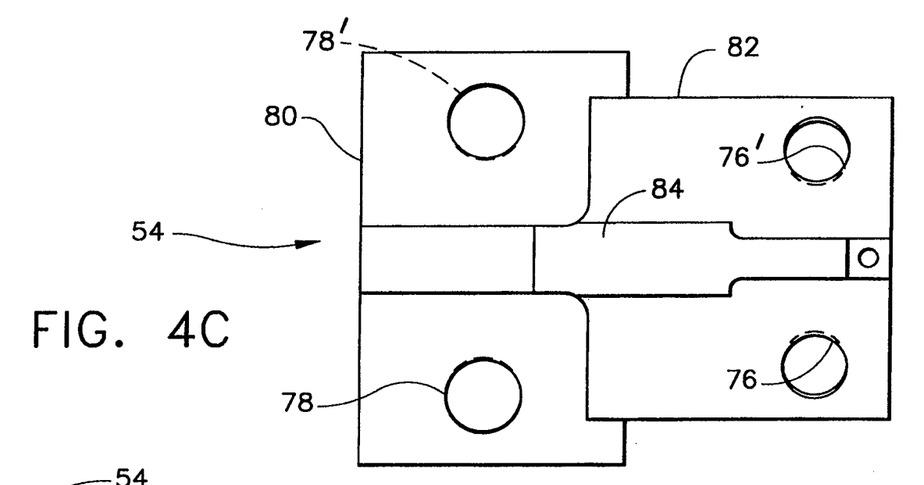

As shown in FIGS. 4A-4C, bracket 54 comprises a lower portion 80, an upper portion 82 and a stiffening rib 84, all of which are integrally formed from a metal alloy (e.g., F304, F304L, F316 or F316L material per ASTM A182) having a carbon content not to exceed 0.02 wt. %. To improve corrosion resistance, the material should be annealed at 1900° to 2100° F. followed by quenching in circulating water to a temperature below 400° F. A pair of circular cylindrical holes 76 are formed in upper portion 82 of bracket 54 for receiving upper bolts 56 respectively. The axes of holes 76 are mutually non-parallel and disposed perpendicular to the cylindrical upper shroud wall 18b when the clamp is installed. A pair of circular cylindrical holes 78 are formed in bracket lower portion 80 for receiving lower bolts 66 respectively. The axes of holes 78 are mutually non-parallel and disposed perpendicular to the cylindrical upper shroud wall 18b when the clamp is installed. Each bracket portion 80 and 82 has a pair of contact surfaces disposed generally parallel to the tangent of the opposing portion of the upper or lower shroud wall.

To install the shroud repair clamps, holes must be formed in the upper and lower shroud walls 18b and 18d. The shapes and positions of these holes can be seen in FIG. 3A. The lower holes 4 and 4' are simple circular cylindrical bores for receiving the circular cylindrical shafts of bolts 66 (shown in FIG. 8). The upper holes 2 and 2' are non-circular and shaped to allow passage therethrough of the head of upper bolt 56, the latter being in the shape of a rectangle with rounded corners. The use of bolts with non-circular heads is necessary because the top guide 19 installed inside the upper shroud wall 18b blocks installation of upper bolts 56 from the interior of the shroud. Instead upper bolts 56 must be installed headfirst from the exterior of the shroud.

The holes in shroud 18 are formed by electrode discharge machining (EDM). The holes are machined parallel to the azimuth line on which the hole pattern is centered. The hole patterns are to be located at the twelve reference bracket location azimuths (see FIG. 9) shown by attaching an EDM alignment fixture yoke onto the shroud lugs. When attached, the EDM alignment fixture is centered in the lugs within 0.25 inch. The dimension is confirmed if the EDM alignment fixture is touching the top guide support ring at both ends of the alignment fixture. Hole locations are controlled by as-built measurements of the alignment fixture and field runout and position measurements of the EDM electrodes. Therefore field verification of the hole locations and sizes is not required.

Figure 5A:
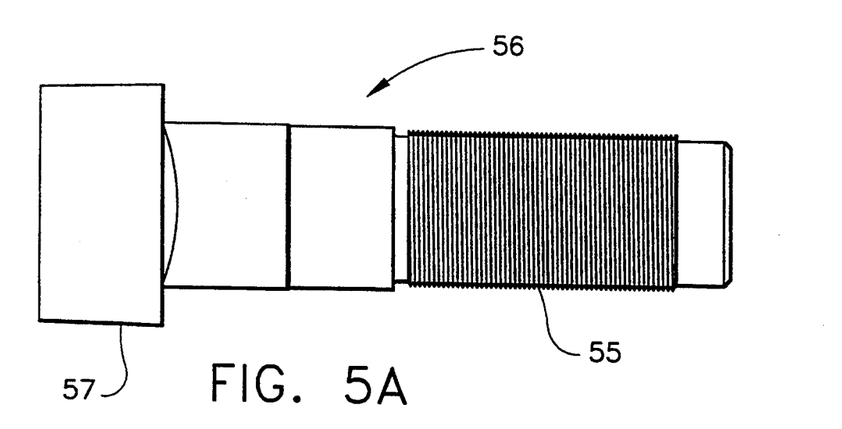
FIGS. 5A and 5B are top and side views, respectively, of an upper bolt incorporated in the shroud repair clamp assembly shown in FIG. 3B.
Figure 5B:
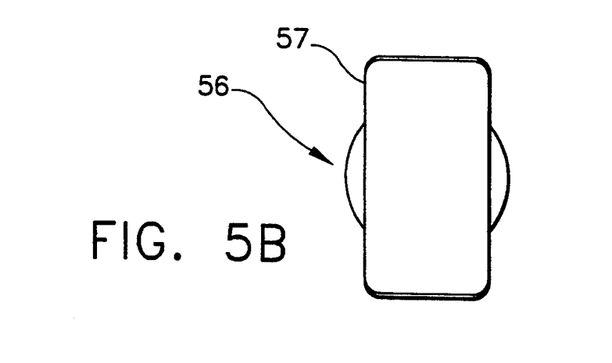

As shown in FIGS. 5A and 5B, each upper bolt 56 has a bolt head 57 of rectangular section with rounded corners and a shaft with a threaded section 55 which cooperates with internal threads on nut 62 (see FIG. 3B). Before bracket 54 is mounted on lower bolts 66, the head of each upper bolt 56 is oriented into alignment with respective holes 2, 2' and then passed therethrough until the bolt head 57 clears the upper shroud wall 18b. Once clear of the upper shroud wall, the upper bolts 56 can be rotated 90° to an orientation of nonalignment with holes 2, 2' in which orientation the bolt head 57 cannot pass back through holes 2, 2'.

Figure 7A:
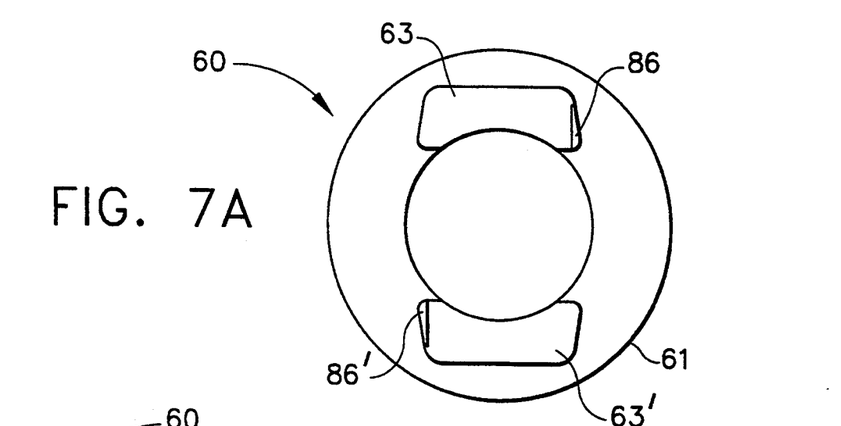
FIGS. 7A and 7B are plan and side views, respectively, of a tang washer incorporated in the shroud repair clamp assembly shown in FIG. 3B.
Figure 7B:
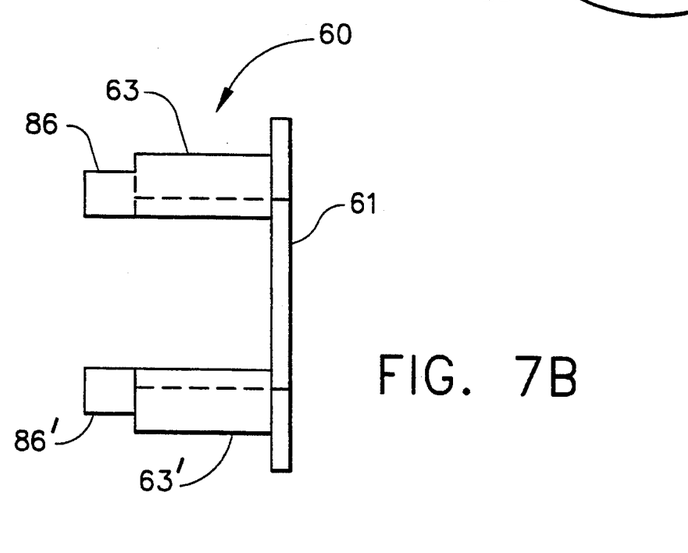

To lock bolt 56 so that its head remains oriented in non-alignment with upper holes 2, 2' a specially designed locking washer 60 (see FIGS. 7A and 7B) is installed in each hole 2, 2'. Each locking washer 60 comprises a thin annular disk 61 which supports a pair of diametrally opposed, axially extending projections 63 and 63'. When locking washer 60 is installed in each upper hole 2, 2', projections 63 and 63' occupy the interstices between the circular shaft of bolt 56 and the non-circular boundary of the upper holes. Each projection in turn has a respective tang 86, 86' extending axially from its end surface. The projections and tangs have lengths such that when locking washers are fully inserted in upper holes 2, 2' (with annular disk 61 flush against the external surface of upper shroud wall 18b), tangs 86 and 86' will project into respective spaces on opposing sides of rectangular bolt head 57. In these positions, the tangs will interfere with and thereby block rotation of upper bolt 56 into a position where head 57 will be aligned with the corresponding upper hole.

Figure 8:
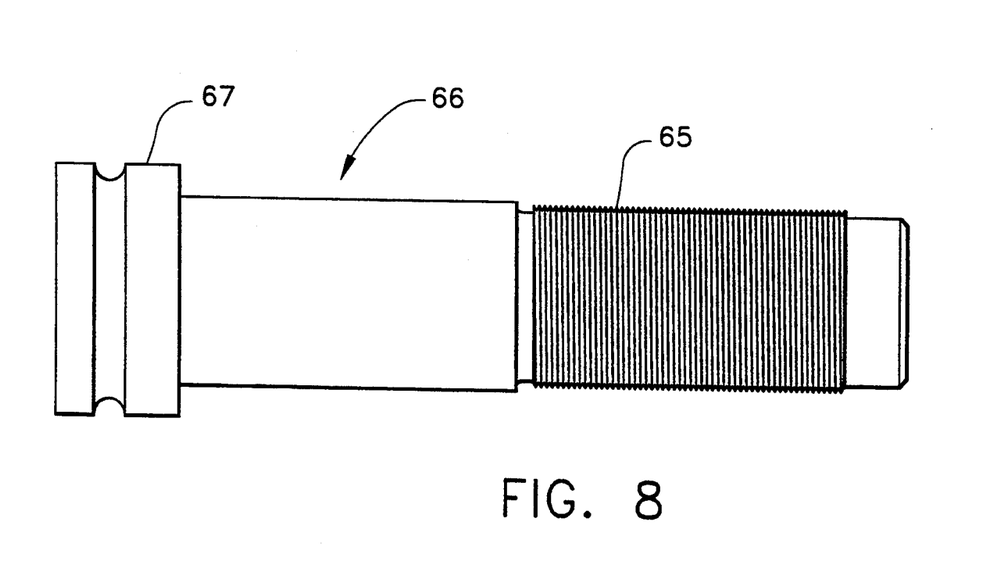
FIG. 8 is a plan view of a lower bolt incorporated in the shroud repair clamp assembly shown in FIG. 3B.

Each of lower bolts 66 has a bolt head 67 of circular section with an outer diameter greater than the diameter of lower holes 4, 4′. The shaft of each bolt 66 is inserted through the respective lower hole from the inside, i.e., core side, of the shroud.

To install the shroud repair clamp, bolts 56 are inserted in upper holes 76, 76′ of bracket 54. Then the bracket is mounted on the shroud by installing bolts 56 headfirst holes 2, 2′ in upper shroud wall 18b. Bolts 66 are inserted in holes 4, 4′ of lower shroud wall 18d and lower holes 78, 78′ of bracket 54 from the core side. Thereafter, an internally threaded nut 68 is screwed onto the threaded shaft 65 of each lower bolt 66 and then tensioned.

Figure 6:
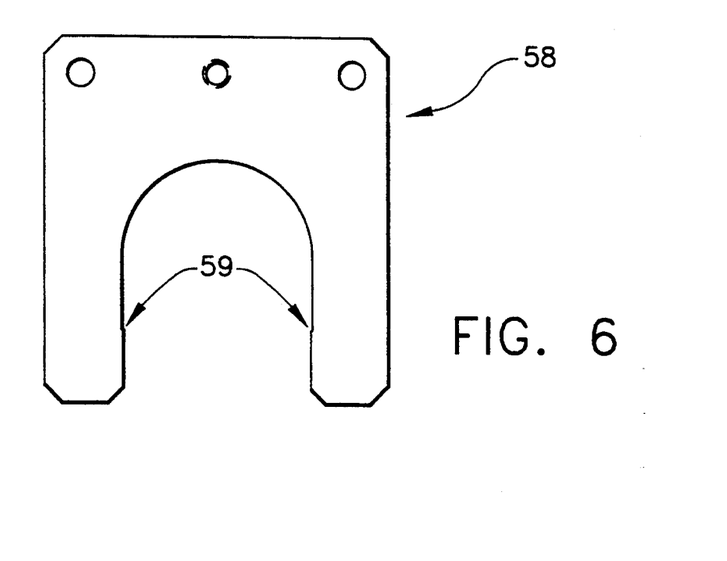
FIG. 6 is a plan view of a shim washer incorporated in the shroud repair clamp assembly shown in FIG. 3B.

With the bracket secured in position, the space between bracket upper portion 82 and annular disk 61 of locking washer 60 is measured. A U-shaped shim washer 58 (see FIG. 6) is then trimmed by machining to a thickness equal to the measured dimension. Then shim washers 58 are installed in the space between annular disk 61 and bracket upper portion 82. The shaft of each upper bolts 56 is received in the opening between the legs of the U-shaped shim washer. Each leg has a shoulder 59, the shoulders being in mutual opposition to form a narrowing of the opening having a dimension slightly less than the outer diameter of the bolt shaft. This enables the shim washers to be clipped onto the bolt shafts so that the washers will not fall off.

After shim washers 58 are properly installed, upper bolts 56 are tensioned as required by tightening of nuts 62. Nuts 62 and 68 are then locked in position by installing and tack welding nut keepers 64 to the shafts of bolts 56 and 66. After tensioning and prior to tack welding, the upper bolt nut keepers are machined to a length such that the end of the keeper is 0.20±0.05 inch from the end of upper bolt 56.

In accordance with the preferred embodiment of the invention, the bolts and nuts are made of XM-19 material per ASTM A479 with a carbon content not to exceed 0.04 wt. %. The XM-19 material should be annealed at 2000°±25° F. followed by cooling at a rate of at least 200° F. per minute. The washers and nut keepers may be made of Type 304, 304L, 316 or 316L stainless steel alloy per ASTM A240 or A276.

Figure 9:
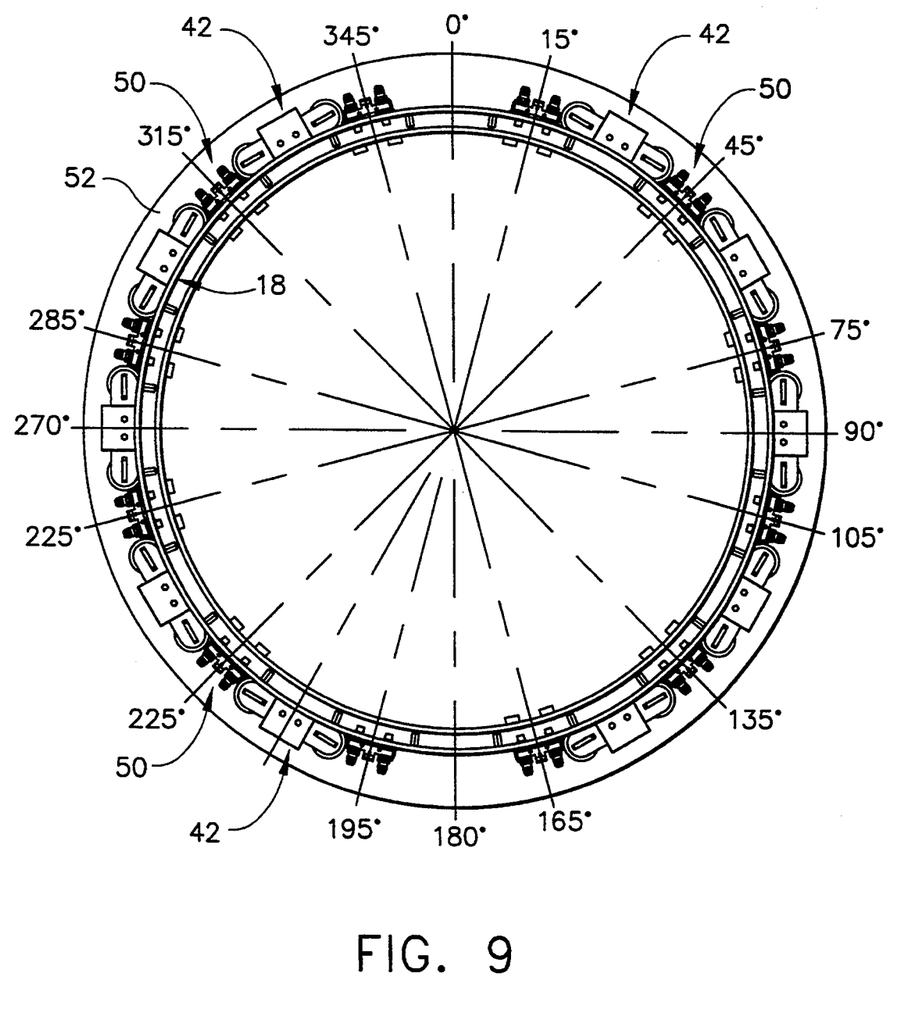
FIG. 9 is a top view showing the placement of clamps in accordance with the shroud repair method of the present invention.

The placement of a plurality of clamps 50 around the periphery of shroud 18 in accordance with the invention is shown in FIG. 9. In a typical BWR, twelve clamps are installed at azimuths of 15°, 45°, 105°, 135°, 165°, 195°, 225°, 255°, 285°, 315° and 345°. The majority of clamps 50 are installed in the spaces between adjacent jet pump assemblies 42.

The preferred embodiment of the shroud repair clamp has been disclosed for the purpose of illustration. Variations and modifications of the disclosed structure which do not depart from the concept of this invention will be readily apparent to mechanical engineers skilled in the art of tooling. For example, the heads of the upper bolts can have non-circular shapes different than rectangles with rounded corners, with corresponding shapes for the upper holes machined in the upper shroud wall. All such variations and modifications are intended to be encompassed by the claims set forth hereinafter.

We claim:

1. A method for repairing a reactor core shroud having a circular cylindrical upper shroud wall of first diameter, a circular cylindrical lower shroud wall of second diameter less than said first diameter, and an annular support ring having a radially outer portion welded to said upper shroud wall and a radially inner portion welded to said lower shroud wall, comprising the steps of clamping said upper shroud wall to said lower shroud wall at a plurality of azimuthal locations distributed about the periphery of said support ring.

2. The method as defined in claim 1, further comprising the steps of machining first and second holes in said upper shroud wall at each of said plurality of azimuthal locations and machining third and fourth holes in said lower shroud wall at each of said plurality of azimuthal locations.

3. The method as defined in claim 2, wherein said first through fourth holes are machined by electrode discharge machining.

4. The method as defined in claim 2, wherein said first and second holes are non-circular and said third and fourth holes are circular.

5. The method as defined in claim 4, wherein said clamping step at each of said plurality of azimuthal locations is performed by bolting an upper portion of a rigid clamp to said upper shroud wall by means of first and second bolts installed in said first and second holes respectively, and bolting a lower portion of a rigid clamp to said lower shroud wall by means of third and fourth bolts installed in said third and fourth holes respectively, said first and second bolts being installed by passing the head of said first and second bolts through said first and second holes respectively from the exterior of said outer shroud wall to the interior of said outer shroud wall, and said third and fourth bolts being installed by passing the shaft of said third and fourth bolts through said third and fourth holes respectively from the interior of said outer shroud wall to the exterior of said outer shroud.

6. The method as defined in claim 5, wherein each of said first and second bolts has a bolt head shaped to pass through said first and second holes when said first and second bolts are coaxial with said first and second holes respectively and oriented in a first angular position, and not pass through said first and second holes when said first and second bolts are coaxial with said first and second holes respectively and oriented in a second angular position separated from said first angular by a predetermined angle of rotation.

7. The method as defined in claim 6, further comprising the step of locking said first and second bolts in said second angular position.

* * * * *